(12) United States Patent
Kim et al.

(10) Patent No.: US 12,119,448 B2
(45) Date of Patent: Oct. 15, 2024

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Shul Kee Kim, Daejeon (KR); Young Min Lim, Daejeon (KR); Ha Eun Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 618 days.

(21) Appl. No.: 17/423,163

(22) PCT Filed: Jan. 16, 2020

(86) PCT No.: PCT/KR2020/000828
§ 371 (c)(1),
(2) Date: Jul. 15, 2021

(87) PCT Pub. No.: WO2020/149678
PCT Pub. Date: Jul. 23, 2020

(65) Prior Publication Data
US 2022/0131192 A1   Apr. 28, 2022

(30) Foreign Application Priority Data

Jan. 17, 2019 (KR) .................. 10-2019-0006094
Jan. 15, 2020 (KR) .................. 10-2020-0005265

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2300/0025* (2013.01)

(58) Field of Classification Search
CPC ......... H01M 10/0567; H01M 10/0525; H01M 2300/0025; H01M 10/4235; H01M 10/052; Y02E 60/10
See application file for complete search history.

(56) References Cited

U.S. PATENT DOCUMENTS

| | | | |
|---|---|---|---|
| 2009/0280414 A1 | 11/2009 | Koh et al. | |
| 2010/0266905 A1 | 10/2010 | Jeon et al. | |
| 2011/0111305 A1 | 5/2011 | Jeon et al. | |
| 2015/0140449 A1 | 5/2015 | Ishikawa et al. | |
| 2015/0228887 A1 | 8/2015 | Park et al. | |
| 2016/0315354 A1 | 10/2016 | Okada et al. | |
| 2017/0117588 A1 | 4/2017 | Fujita et al. | |
| 2017/0200976 A1 | 7/2017 | Nakazawa et al. | |
| 2017/0222264 A1 | 8/2017 | Morinaka et al. | |
| 2018/0358655 A1 | 12/2018 | Kono et al. | |
| 2019/0020063 A1 | 1/2019 | Kim et al. | |
| 2020/0044287 A1 | 2/2020 | Kim et al. | |
| 2021/0028491 A1 | 1/2021 | Morinaka et al. | |

FOREIGN PATENT DOCUMENTS

| | | |
|---|---|---|
| CN | 101517813 A | 8/2009 |
| CN | 103000942 A | 3/2013 |
| CN | 106785041 A | 5/2017 |
| CN | 107591564 A | 1/2018 |
| EP | 3131153 A1 | 2/2017 |
| EP | 3279995 A1 | 2/2018 |
| EP | 3396770 A1 | 10/2018 |
| JP | 2000348759 A | 12/2000 |
| JP | 2016192357 A | 11/2016 |
| JP | 2016192381 A | 11/2016 |
| JP | 2017147130 A | 8/2017 |
| JP | 2017147389 A | 8/2017 |
| KR | 20080026522 A | 3/2008 |
| KR | 20090018003 A | 2/2009 |
| KR | 20140046364 A | 4/2014 |
| KR | 20150056481 A | 5/2015 |
| KR | 20160138402 A | 12/2016 |
| KR | 20170033437 A | 3/2017 |
| KR | 20170132239 A | 12/2017 |
| KR | 20180054499 A | 5/2018 |
| WO | 2008035928 A1 | 3/2008 |
| WO | 2009022848 A1 | 2/2009 |
| WO | 2009038358 A1 | 3/2009 |
| WO | 2016158986 A1 | 10/2016 |
| WO | 2019013501 A1 | 1/2019 |
| WO | WO2019103496 * | 5/2019 |

OTHER PUBLICATIONS

International Search Report for Application No. PCT/KR2020/000828 mailing dated May 12, 2020, 3 pages.
Extended European Search Report including Written Opinion for Application No. 20741908.6 dated Feb. 4, 2022, pp. 1-9.

* cited by examiner

*Primary Examiner* — Lisa S Park
(74) *Attorney, Agent, or Firm* — Lerner David LLP

(57) ABSTRACT

A non-aqueous electrolyte solution for a lithium secondary battery and a lithium secondary battery including the same are disclosed herein. In some embodiments, and particularly, to a non-aqueous electrolyte solution includes a lithium salt, an organic solvent, a first additive, and a second additive, wherein the first additive is a compound represented by Formula 1 and the second additive is a compound represented by Formula 2.

10 Claims, No Drawings

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2020/000828, filed on Jan. 16, 2020, which claims priority from Korean Patent Application Nos. 10-2019-0006094, filed on Jan. 17, 2019, and 10-2020-0005265, filed on Jan. 15, 2020, the disclosures of which are incorporated by reference herein.

TECHNICAL FIELD

The present invention relates to a non-aqueous electrolyte solution for a lithium secondary battery and a lithium secondary battery including the same.

BACKGROUND ART

Recently, interests in energy storage technologies have been increasingly grown, and efforts for research and development of electrochemical devices have been gradually materialized as the application of the energy storage technologies is expanded to the energy of mobile phones, camcorders, notebook PCs, and even to electric vehicles.

There emerges an interest in the development of rechargeable secondary batteries among these electrochemical devices, and, particularly, lithium secondary batteries developed in the early 1990's are spotlighted because the lithium secondary batteries are advantageous in that they have higher operating voltage and significantly higher energy density.

A lithium secondary battery currently used is composed of a carbon-based negative electrode capable of intercalating and deintercalating lithium ions, a positive electrode formed of a lithium-containing transition metal oxide, and a non-aqueous electrolyte solution in which an appropriate amount of a lithium salt is dissolved in a carbonate-based organic solvent.

Charge and discharge of a lithium secondary battery is possible because lithium ions, which are discharged from the positive electrode by charging, transfer energy while a phenomenon is repeated in which the lithium ions are intercalated into the negative electrode, for example, carbon particles, and deintercalated during discharging.

Highly reactive lithium ions discharged from the positive electrode during initial charge of the lithium secondary battery react with the carbon-based negative electrode to form an organic material and $Li_2CO_3$, $Li_2O$, or LiOH, and these may form a kind of a passivation layer on a surface of the negative electrode. The layer is denoted as a solid electrolyte interface (SEI) layer.

Once the SEI layer is formed during the initial charge, the SEI layer may prevent a reaction of the lithium ions with the carbon-based negative electrode or other materials during repeated charge and discharge and may act as an ion tunnel that only passes the lithium ions between the electrolyte solution and the negative electrode. Since the SEI layer blocks organic solvents of the electrolyte solution having a high molecular weight from moving to the carbon-based negative electrode by an effect of the ion tunnel, it prevents the collapse of a structure of the carbon-based negative electrode. That is, since the lithium ions do not cause a side reaction with the carbon-based negative electrode or other materials again once the layer is formed, an amount of the lithium ions is reversibly maintained during subsequent charge and discharge. In other words, since a carbon material of the negative electrode reacts with the electrolyte solution during initial charge to form a passivation layer on the surface of the negative electrode, no further decomposition of the electrolyte solution occurs and stable charge and discharge may be maintained, and, in this case, an amount of charge consumed in the formation of the passivation layer on the surface of the negative electrode is irreversible capacity, wherein it has characteristic of not reacting reversibly during discharge, and, for this reason, the lithium ion battery may maintain a stable life cycle without exhibiting any further irreversible reaction after an initial charge reaction.

However, in a case in which the lithium secondary battery is subjected to high-temperature storage in a fully charged state (e.g.: storage at 60° C. after charged to 100% at 4.15 V or more), the SEI layer is gradually collapsed over time.

The collapse of the SEI layer exposes the surface of the negative electrode, and the exposed surface of the negative electrode is decomposed while being reacted with a carbonate-based solvent in the electrolyte solution to cause a continuous side reaction. Furthermore, the side reaction continuously generates gas. Regardless of types of the gases generated in this case, since the continuous generation of the gas at high temperatures increases an internal pressure of the lithium ion battery and acts as a resistance element for lithium movement, it expands a battery thickness and becomes a cause of degradation of battery performance.

Stability and long-life characteristics are constantly required in harsh environments, such as high-temperature and low-temperature environments, as application fields of the lithium secondary battery have recently been expanded. Such performances are largely dependent on the SEI layer formed by the initial reaction of the electrode and the electrolyte solution.

Thus, in order to improve high-temperature cycle characteristics and low-temperature output of the lithium secondary battery, there has been continuous development of an additive which may suppress a side reaction between the positive electrode and the electrolyte solution and may form a robust SEI layer on the surface of the negative electrode.

Prior Art Document: Korean Patent Application Laid-open Publication No. 2017-0033437

DISCLOSURE OF THE INVENTION

Technical Problem

An aspect of the present invention provides a non-aqueous electrolyte solution for a lithium secondary battery which includes an additive capable of forming a stable film on the surface of an electrode.

Another aspect of the present invention provides a lithium secondary battery in which high-temperature durability is improved by including the non-aqueous electrolyte solution for a lithium secondary battery.

Technical Solution

According to an aspect of the present invention, there is provided a non-aqueous electrolyte solution for a lithium secondary battery which includes a lithium salt; an organic solvent; a first additive; and a second additive, wherein the first additive is a compound represented by Formula 1 below, and the second additive is a compound represented by Formula 2 below.

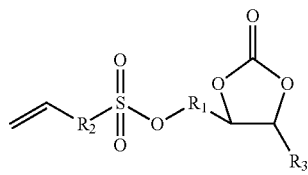

[Formula 1]

In Formula 1, $R_1$ and $R_2$ are each independently a substituted or unsubstituted alkylene group having 1 to 5 carbon atoms, and $R_3$ is hydrogen or a substituted or unsubstituted alkyl group having 1 to 5 carbon atoms.

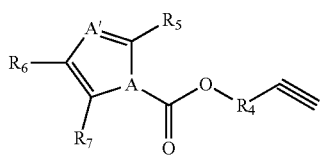

[Formula 2]

In Formula 2,

A and A' are each independently oxygen (O), sulfur (S), or nitrogen (N), $R_4$ is a substituted or unsubstituted alkylene group having 1 to 5 carbon atoms, and $R_5$ to $R_7$ are each independently hydrogen or an alkyl group having 1 to 4 carbon atoms.

A weight ratio of the first additive:the second additive may be in a range of 1:0.01 to 1:10.

According to another aspect of the present invention, there is provided a lithium secondary battery including the non-aqueous electrolyte solution for a lithium secondary battery of the present invention.

Advantageous Effects

According to the present invention, a non-aqueous electrolyte solution for a lithium secondary battery, which may form a stable passivation layer on surfaces of a positive electrode and a negative electrode and may simultaneously stabilize anions of a lithium salt, may be prepared by mixing two types of compounds capable of forming a layer on the surface of the electrode in a specific ratio and including the mixture. Also, a lithium secondary battery may be prepared in which overall performance, such as cycle capacity characteristics during high-temperature storage and suppression of resistance increase, is improved by including the non-aqueous electrolyte solution.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Also, the terminology used herein is for the purpose of describing particular example embodiments only and is not intended to be limiting of the present invention. In the specification, the terms of a singular form may comprise plural forms unless referred to the contrary.

Before describing the present invention, it will be further understood that the terms "include," "comprise," or "have" when used in this specification, specify the presence of stated features, numbers, steps, elements, or combinations thereof, but do not preclude the presence or addition of one Or more other features, numbers, steps, elements, or combinations thereof.

The expressions "a" and "b" in the description of "a to b carbon atoms" in the specification each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, $-CH_2-$, $-CH_2CH_2-$, $-CH_2CH_2CH_2-$, $-CH_2(CH_2)CH-$, $-CH(CH_2)CH_2-$, and $-CH(CH_2)CH_2CH_2-$.

The expression "alkylene group" denotes a branched or unbranched divalent unsaturated hydrocarbon group. In an embodiment, the alkylene group may include a methylene group, an ethylene group, a propylene group, an isopropylene group, a butylene group, an isobutylene group, a tert-butylene group, a pentylene group, and 3-pentylene group.

Also, unless otherwise defined in the specification, the expression "substitution" denotes that at least one hydrogen bonded to carbon is substituted with an element other than hydrogen, for example, an alkyl group having 1 to 3 carbon atoms.

Non-aqueous Electrolyte Solution for Lithium Secondary Battery

According to an embodiment, the present invention provides a non-aqueous electrolyte solution for a lithium secondary battery which includes:

a lithium salt; an organic solvent; a first additive; and a second additive, wherein the first additive is a compound represented by Formula 1 below, and the second additive is a compound represented by Formula 2 below.

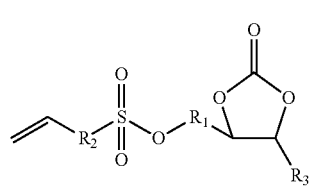

[Formula 1]

In Formula 1, $R_1$ and $R_2$ are each independently a substituted or unsubstituted alkylene group having 1 to 5 carbon atoms, and $R_3$ is hydrogen or a substituted or unsubstituted alkyl group having 1 to 5 carbon atoms.

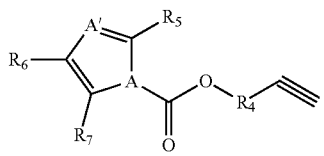

[Formula 2]

In Formula 2,

A and A' are each independently oxygen (O), sulfur (S), or nitrogen (N), $R_4$ is a substituted or unsubstituted alkylene group having 1 to 5 carbon atoms, and $R_5$ to $R_7$ are each independently hydrogen or an alkyl group having 1 to 4 carbon atoms.

Hereinafter, each component of the non-aqueous electrolyte solution for a lithium secondary battery of the present invention will be described in more detail.

(1) Lithium Salt

In the non-aqueous electrolyte solution for a lithium secondary battery according to the embodiment of the present invention, any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $ClO_4^-$, $BF_4^-$, $B_{10}Cl_{10}^-$, $PF_6^-$, $CF_3SO_3^-$, $CH_3CO_2^-$, $CF_3CO_2^-$, $AsF_6^-$, $SbF_6^-$, $AlCl_4^-$, $AlO_4^-$, $CH_3SO_3^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_4)_3C^-$, $(CF_3SO_2)_3C^-$, $CF_3(CF_2)_7SO_3^-$, $SCN^-$, and $(CF_3CF_2SO_2)_2N^-$ as an anion.

Specifically, the lithium salt may include a single material selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, $LiCH_3SO_3$, lithium bis (fluorosulfonyl) imide (LiFSI, $LiN(SO_2F)_2$), lithium bis (trifluoromethanesulfonyl) imide (LiTFSI, $LiN(SO_2CF_3)_2$), and lithium bisperfluoroethanesulfonimide (LiBETI, $LiN(SO_2C_2F_5)_2$), or a mixture of two or more thereof. More specifically, the lithium salt may include a single material selected from the group consisting of $LiPF_6$, $LiBF_4$, $LiCH_3CO_2$, $LiCF_3CO_2$, $LiCH_3SO_3$, LiFSI, LiTFSI, and $LiN(C_2F_5SO_2)_2$, or a mixture of two or more thereof.

The lithium salt may be appropriately changed in a normally usable range, but may specifically be included in a concentration of 0.1 M to 3 M, for example, 0.8 M to 2.5 M in the electrolyte solution. In a case in which the concentration of the lithium salt is greater than 3 M, since a lithium ion-transfer effect may be reduced and wetting of the non-aqueous electrolyte solution may be reduced due to an increase in viscosity of the non-aqueous electrolyte solution, it may be difficult to form a solid electrolyte interface (SEI) having a uniform thickness on a surface of an electrode.

(2) Organic Solvent

A type of the organic solvent is not limited as long as the organic solvent may minimize decomposition due to an oxidation reaction during charge and discharge of the secondary battery and may exhibit desired characteristics with the additive. For example, a carbonate-based organic solvent, an ether-based solvent, or an ester-based solvent may be used alone or in mixture of two or more thereof.

The carbonate-based organic solvent among the organic solvents may include at least one of a cyclic carbonate-based organic solvent and a linear carbonate-based organic solvent. Specifically, the cyclic carbonate-based organic solvent may include at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), and may specifically include a mixed solvent of ethylene carbonate having high permittivity and propylene carbonate having a relatively lower melting point than the ethylene carbonate.

Also, the linear carbonate-based organic solvent, as a solvent having low viscosity and low permittivity, may include at least one selected from the group consisting of dimethyl carbonate (DMC), diethyl carbonate (DEC), dipropyl carbonate, ethylmethyl carbonate (EMC), methylpropyl carbonate, and ethylpropyl carbonate, and may specifically include dimethyl carbonate.

As the ether-based organic solvent, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

The ester-based organic solvent may include at least one selected from the group consisting of a linear ester-based organic solvent and a cyclic ester-based organic solvent.

In this case, specific examples of the linear ester-based organic solvent may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester-based organic solvent may be any one selected from the group consisting of γ-butyrolactone, γ-valerolactone, γ-caprolactone, σ-valerolactone, and ε-caprolactone, or a mixture of two or more thereof, but the present invention is not limited thereto.

A highly viscous cyclic carbonate-based organic solvent, which well dissociates the lithium salt in the electrolyte due to high permittivity, may be used as the organic solvent. Also, in order to prepare an electrolyte having higher electrical conductivity, the cyclic carbonate-based organic solvent may be mixed with the low viscosity, low permittivity linear carbonate-based compound, such as dimethyl carbonate and diethyl carbonate, and the linear ester-based compound in an appropriate ratio and used as the organic solvent.

Specifically, the cyclic carbonate-based compound and the linear carbonate-based compound may be mixed and used as the organic solvent, and a weight ratio of the cyclic carbonate-based compound:the linear carbonate-based compound in the organic solvent may be in a range of 10:90 to 70:30.

(3) First Additive

The non-aqueous electrolyte solution for a lithium secondary battery of the present invention may include a compound represented by Formula 1 below as a first additive.

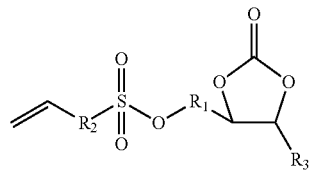

[Formula 1]

In Formula 1, $R_1$ and $R_2$ are each independently a substituted or unsubstituted alkylene group having 1 to 5 carbon atoms, and $R_3$ is hydrogen or a substituted or unsubstituted alkyl group having 1 to 5 carbon atoms.

The compound represented by Formula 1 may be electrochemically decomposed on surfaces of a positive electrode and a negative electrode to form a robust SEI that does not crack even during high-temperature storage while a carbonate group and a sulfonate group, which are contained in a structure of the compound, are reduced during charge and discharge. Also, a double bond structure contained in the structure of the compound may undergo a reduction reaction at the negative electrode during charge and discharge to form a more robust SEI on the surfaces of the positive electrode and the negative electrode. The SEI robustly formed may prevent exposure of the surfaces of the positive electrode and the negative electrode to the non-aqueous electrolyte solution. Thus, it may improve high-temperature durability of the battery by suppressing generation of $O_2$ from the positive electrode and a side reaction between the positive electrode and the electrolyte solution. Furthermore, even in a case in which a high crystalline carbon material, such as natural graphite or artificial graphite, is used as a negative electrode active material in the negative electrode, gas generation during high-temperature storage may be suppressed and high-temperature storage characteristics of the battery may be improved by suppressing the decomposition of the organic solvent.

In Formula 1, $R_1$ and $R_2$ may each independently be an unsubstituted alkylene group having 1 to 4 carbon atoms, and $R_3$ may be hydrogen or an alkyl group having 1 to 3 carbon atoms. Specifically, in Formula 1, $R_1$ and $R_2$ may each independently be an unsubstituted alkylene group having 1 to 3 carbon atoms, and $R_3$ may be hydrogen.

More specifically, the compound represented by Formula 1 may include a compound represented by Formula 1a below.

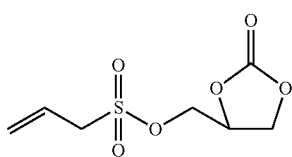

[Formula 1a]

The compound represented by Formula 1 may be appropriately used depending on an amount of the electrolyte additive generally added to the electrolyte, and, for example, may be included in an amount of 0.01 wt % to 5 wt %, for example, 0.1 wt % to 3 wt % based on a total weight of the non-aqueous electrolyte solution for a lithium secondary battery.

In a case in which the additive is included within the above range, a robust SEI may be stably formed on the surfaces of the positive electrode and the negative electrode, and the resulting effect may be obtained.

If the amount of the compound represented by Formula in the non-aqueous electrolyte solution for a lithium secondary battery is greater than 5 wt %, since an excessively thick film may be formed during initial charge, resistance may be increased and output may be degraded. Also, if the compound represented by Formula 1 is included in an amount of less than 0.01 wt % in the non-aqueous electrolyte solution, since an unstable SEI is formed due to an insignificant film-forming effect, degradation of overall performance may occur, for example, resistance is increased after high-temperature storage and capacity is reduced.

(4) Second Additive

Also, the non-aqueous electrolyte solution for a lithium secondary battery of the present invention may include a compound represented by Formula 2 below as a second additive.

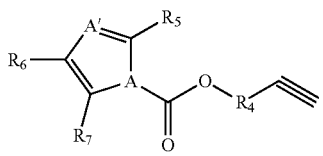

[Formula 2]

In Formula 2,

A and A' are each independently O, S, or N, $R_4$ is a substituted or unsubstituted alkylene group having 1 to 5 carbon atoms, and $R_5$ to $R_7$ are each independently hydrogen or an alkyl group having 1 to 4 carbon atoms.

The compound represented by Formula 2 is a compound capable of giving a synergistic effect on the SEI-forming effect of the compound represented by Formula 1 included as the first additive, wherein a triple bond structure may be electrochemically decomposed on the surface of the negative electrode according to the reduction reaction during operation of the battery to form a more robust SEI that does not crack even during high-temperature storage. Also, the heterocycloalkylene structure may stabilize anions of the lithium salt while reacting with the anions of the lithium salt. Thus, since a side reaction between the non-aqueous electrolyte solution and the electrode during high-temperature storage is suppressed and, particularly, an increase in resistance is prevented by suppressing a side reaction of the anions at high temperatures, cycle capacity characteristics during high-temperature storage of the lithium secondary battery may be improved.

In Formula 2, A and A' may all be N, $R_4$ may be a substituted or unsubstituted alkylene group having 1 to 3 carbon atoms, and $R_5$ to $R_7$ may each independently be hydrogen or an alkyl group having 1 to 3 carbon atoms.

Specifically, the compound represented by Formula 2 may include at least one selected from the group consisting of compounds represented by Formulae 2a and 2b below.

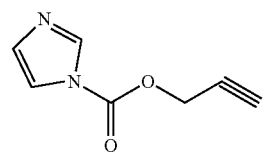

[Formula 2a]

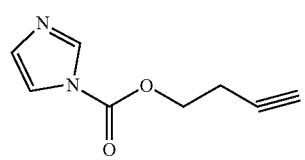

[Formula 2b]

A weight ratio of the first additive:the second additive may be in a range of 1:0.01 to 1:10, particularly 1:0.01 to 1:5, and more particularly 1:0.01 to 1:1.

In a case in which each component of the additive is mixed in the above ratio, since the stabilizing effect during the formation of the SEI and the lithium salt anion stabilization effect may be secured, a secondary battery having more improved overall performance, such as high-temperature durability and gas generation reducing effect, may be prepared. That is, in the non-aqueous electrolyte solution of the present invention, the weight ratio of the second additive to the first additive must be 10 or less in order for the second additive to compensate for the first additive and create a synergistic effect for the formation of the SEI.

If the ratio of the second additive to the first additive is outside the above range, initial resistance is increased so that it may negatively affect achievement of initial capacity. For example, in a case in which the weight ratio of the second additive to the first additive is greater than 10, since an excessively thick SEI is formed to interfere with adsorption/desorption of lithium, the resistance may be increased to cause degradation of output characteristics and cycle life characteristics. If, in a case in which the weight ratio of the second additive to the first additive is less than 0.01, since the film-forming effect on the surfaces of the positive electrode and the negative electrode is insignificant, the anion stabilization effect is reduced and a side reaction between the electrolyte solution and the negative electrode occurs, and thus, the overall performance of the secondary battery may be degraded.

A total amount of the first additive and the second additive may be in a range of 10 wt % or less, preferably 0.01 wt % to 9 wt % or less, and particularly 0.5 wt % to 8 wt % or less.

In a case in which the total amount of the first additive and the second additive is greater than 10 wt %, capacity retention and effects of suppressing resistance increase rate and thickness increase rate are improved while an excessively thick film is formed by the excessive amount of the additive, but, since the resistance is increased to a predetermined level or more in lithiation and delithiation processes, initial resistance may be increased and initial capacity may be reduced.

As described above, since the first additive and the second additive are mixed in a specific ratio in the non-aqueous electrolyte solution for a lithium secondary battery of the present invention, a more stable and robust SEI may not only be formed on the surfaces of the positive electrode and the negative electrode, but the electrolyte solution side reaction during high-temperature storage may also be suppressed by ensuring the additional lithium salt anion stabilization effect by the second additive, and, accordingly, the gas generation may be suppressed. Furthermore, overall performance improvement, for example, an improvement in capacity characteristics during high-temperature storage and resistance suppression, may be promoted.

(5) Additive for Forming SEI

The non-aqueous electrolyte solution of the present invention may further include an additional additive which may be used with the mixed additive to form a stable film on the surfaces of the negative electrode and the positive electrode while not significantly increasing initial resistance in addition to the effect from the mixed additive, or which may act as a complementary agent for suppressing the decomposition of the solvent in the non-aqueous electrolyte solution and improving the mobility of lithium ions.

The additional additive is not particularly limited as long as it is an additive for forming an SEI that may form a stable film on the surfaces of the positive electrode and the negative electrode.

Specifically, as a representative example of the additive for forming an SEI, the non-aqueous electrolyte solution for a lithium secondary battery may include at least one additive for forming an SEI which is selected from the group consisting of a halogen-substituted or unsubstituted cyclic carbonate-based compound, a nitrile-based compound, a phosphate-based compound, a borate-based compound, a sulfate-based compound, a sultone-based compound, and a lithium salt-based compound.

Specifically, the halogen-substituted or unsubstituted cyclic carbonate-based compound may improve durability of the battery by forming a stable SEI mainly on the surface of the negative electrode during battery activation.

The halogen-substituted cyclic carbonate-based compound may include fluoroethylene carbonate (FEC), and the halogen-unsubstituted cyclic carbonate-based compound may include vinylene carbonate (VC) or vinyl ethylene carbonate.

The halogen-substituted or unsubstituted cyclic carbonate-based compound may be included in an amount of 5 wt % or less based on the total weight of the non-aqueous electrolyte solution. In a case in which the amount of the halogen-substituted carbonate-based compound in the non-aqueous electrolyte solution is greater than 5 wt %, cell swelling inhibition performance and initial resistance may deteriorate.

In a case in which the nitrile-based compound is used with the above-described electrolyte solution additive, an effect, such as an improvement of high-temperature characteristics, may be expected due to positive electrode/negative electrode film stabilization. That is, the nitrile-based compound may act as a complementary agent for forming the negative electrode SEI, may play a role in suppressing the decomposition of the solvent in the non-aqueous electrolyte solution, and may play a role in improving the mobility of the lithium ions. Typical examples of the nitrile-based compound may be at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, 1,4-dicyano-2-butene, glutaronitrile, 1,3,6-hexanetricarbonitrile, and pimelonitrile.

The nitrile-based compound may be included in an amount of 8 wt % or less based on the total weight of the non-aqueous electrolyte solution. In a case in which the total amount of the nitrile-based compound in the non-aqueous electrolyte solution is greater than 8 wt %, since the resistance is increased due to an increase in the film formed on the surface of the electrode, battery performance may deteriorate.

Furthermore, since the phosphate-based compound stabilizes $PF_6$ anions in the electrolyte solution and assists in the formation of the positive electrode and negative electrode films, the phosphate-based compound may improve the durability of the battery. The phosphate-based compound may include at least one compound selected from the group consisting of lithium difluoro bis (oxalato) phosphate (LiDFOP), lithium difluorophosphate (LiDFP, $LiPO_2F_2$), lithium tris(trimethylsilyl)phosphite (TMSPi), tris(trimethylsilyl) phosphate (TMSPa), ethyl di (prop-2-yn-1-yl) phosphate, allyl diphosphate, tris (2,2,2-trifluoroethyl) phosphate (TFEPa), and tris (trifluoroethyl) phosphite, and the phosphate-based compound may be included in an amount of 3 wt % or less based on the total weight of the non-aqueous electrolyte solution.

Since the borate-based compound promotes ion-pair separation of a lithium salt, the borate-based compound may improve the mobility of lithium ions, may reduce the interfacial resistance of the SEI, and may dissociate a material, such as LiF, which may be formed during a battery reaction but is not well separated, and thus, a problem, such as generation of hydrofluoric acid gas, may be solved. The borate-based compound may include lithium bisoxalylborate (LiBOB, $LiB(C_2O_4)_2$) lithium oxalyldifluoroborate, or tetramethyl trimethylsilyl borate (TMSB), and the borate-based compound may be included in an amount of 3 wt % or less based on the total weight of the non-aqueous electrolyte solution.

The sulfate-based compound may include ethylene sulfate (Esa), trimethylene sulfate (TMS), methyl trimethylene sulfate (MTMS), 1,3-propanediol cyclic sulfate, 1,3-butylenesulfate, 2-acetoxy-1,3-propanesultone, methylene methanedisulfonate, or 1,4-bis(methanesulfonyloxy)-2-butyne, and may be included in an amount of 3 wt % or less based on the total weight of the non-aqueous electrolyte solution.

The sultone-based compound may include at least one compound selected from the group consisting of 1,3-propanesultone (PS), 1,4-butane sultone, ethane sultone, 1,3-propene sultone (PRS), 1,4-butene sultone, and 1-methyl-1,3-propene sultone, and may be included in an amount of 0.3 wt % to 5 wt %, for example, 1 wt % to 5 wt % based on the total weight of the non-aqueous electrolyte solution. In a case in which the amount of the sultone-based compound in the non-aqueous electrolyte solution is greater than 5 wt %, since an excessively thick film is formed on the surface of the electrode, an increase in resistance and a degradation of output may occur and output characteristics may be degraded due to the increase in the resistance caused by the excessive amount of the additive in the non-aqueous electrolyte solution.

Also, the lithium salt-based compound is a compound different from the lithium salt included in the non-aqueous electrolyte solution, wherein the lithium salt-based compound may include at least one compound selected from the group consisting of lithium methyl sulfate, lithium ethyl sulfate, lithium 2-trifluoromethyl-4,5-dicyanoimidazole, lithium tetrafluorooxalatophosphate, LiODFB, and $LiBF_4$, and may be included in an amount of 3 wt % or less based on the total weight of the non-aqueous electrolyte solution.

Two or more of the additives for forming an SEI may be mixed and used, and the first additive for forming an SEI may be included in an amount of 15 wt % or less, and particularly 0.01 wt % to 10 wt %, for example, 0.1 wt % to 5.0 wt % based on the total weight of the electrolyte solution.

In a case in which the amount of the additive for forming an SEI is less than 0.01 wt %, the high-temperature storage characteristics and the gas generation reducing effect to be achieved from the additive may be insignificant, and, in a case in which the amount of the additive for forming an SEI is greater than 15 wt %, the side reaction in the electrolyte solution during charge and discharge of the battery may excessively occur. Particularly, if the excessive amount of the additive for forming an SEI is added, the first additive for forming an SEI may not be sufficiently decomposed so that it may be present in the form of an unreacted material or precipitates in the electrolyte solution at room temperature. Accordingly, resistance may be increased to degrade life characteristics of the secondary battery.

Lithium Secondary Battery

Also, in an embodiment of the present invention, there is provided a lithium secondary battery including the non-aqueous electrolyte solution for a lithium secondary battery of the present invention.

The lithium secondary battery of the present invention may be prepared by injecting the non-aqueous electrolyte solution of the present invention into an electrode assembly formed by sequentially stacking a positive electrode, a negative electrode, and a separator disposed between the positive electrode and the negative electrode. In this case, those typically used in the preparation of the lithium secondary battery may all be used as the positive electrode, the negative electrode, and the separator which constitute the electrode assembly.

The positive electrode and the negative electrode, which constitute the lithium secondary battery of the present invention, may be prepared by a typical method and used.

(1) Positive Electrode

The positive electrode may be prepared by forming a positive electrode material mixture layer on a positive electrode collector. The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, in terms of the improvement of capacity characteristics and stability of the battery, the lithium composite metal oxide may include a lithium-nickel-manganese-cobalt-based oxide (e.g., $Li(Ni_p Co_q Mn_{r1})O_2$ (where $0<p<1$, $0<q<1$, $0<r1<1$, and $p+q+r1=1$), $Li(Ni_{p1} Co_{q1} Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2} Co_{q2} Mn_{r3} M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.).

Typical examples of the positive electrode active material may be $Li(Ni_{1/3} Mn_{1/3} Co_{1/3})O_2$, $Li(Ni_{0.35} Mn_{0.28} Co_{0.37})O_2$, $Li(Ni_{0.6} Mn_{0.2} CO_{0.2})O_2$, $Li(Ni_{0.5} Mn_{0.3} Co_{0.2})O_2$, $Li(Ni_{0.7} Mn_{0.15} Co_{0.15})O_2$, $Li(Ni_{0.8} Mn_{0.1} CO_{0.1})O_2$, or $Li(Ni_{0.8} Co_{0.18} Al_{0.05})O_2$.

In addition to the lithium-nickel-manganese-cobalt-based oxide, the positive electrode active material may further include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y} Mn_Y O_2$ (where $0<Y<1$), $LiMn_{2-Z} Ni_Z O_4$ (where $0<Z<2$), etc.), lithium-nickel-cobalt-based oxide (e.g., $LiNi_{1-Y1} Co_{Y1} O_2$ (where $0<Y1<1$), or lithium-manganese-cobalt-based oxide (e.g., $LiCo_{1-Y2} Mn_{Y2} O_2$ (where $0<Y2<1$), $LiMn_{2-Z1} Co_{Z1} O_4$ (where $0<Z1<2$), etc.), and any one thereof or a compound of two or more thereof may be included.

The positive electrode active material may include $LiCoO_2$, $LiMnO_2$, or $LiNiO_2$.

The positive electrode active material may be included in an amount of 90 wt % to 99 wt %, for example, 93 wt % to 98 wt %, based on a total weight of solid content in the positive electrode slurry.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene terpolymer, a sulfonated ethylene-propylene-diene terpolymer, a styrene-butadiene rubber, a fluoro rubber, various copolymers, and the like.

Any conductive agent may be used as the conductive agent without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 1 wt % to 30 wt % based on the total weight of the solid content in the positive electrode slurry.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 70 wt %, for example, 20 wt % to 60 wt %.

(2) Negative Electrode

The negative electrode may be prepared by forming a negative electrode material mixture layer on a negative electrode collector. The negative electrode material mixture layer may be formed by coating the negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \leq 1$; $1-y \leq 3$; $1 \leq z \leq 8$) may be used as the metal composite oxide.

The material, which may be doped and undoped with lithium, may include Si, $SiO_x$ ($0 < x \leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene polymer, a sulfonated ethylene-propylene-diene polymer, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers and metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the negative electrode slurry including the negative electrode active material as well as selectively the binder and the conductive agent is in a range of 50 wt % to 75 wt %, for example, 50 wt % to 65 wt %.

Also, an organic separator or organic and inorganic material composite separators may be used as a separator.

A porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the organic separator, and a typical porous nonwoven fabric, for example, a nonwoven fabric formed of high melting point glass fibers or polyethylene terephthalate fibers may be used.

Porous organic and inorganic material composite safety-reinforcing separators (SRS) coated with a porous coating layer containing organic particles and binder polymer on the porous polyolefin-based separator base material may be used as the organic and inorganic material composite separators.

It is desirable to use inorganic particles having lithium ion transfer ability or a mixture thereof as the inorganic particles, and typical examples of the inorganic particles may be a single material selected from the group consisting of $BaTiO_3$, $Pb(Zr,Ti)O_3$ (PZT), $Pb_{1-x}La_xZr_{1-y}Ti_yO_3$ (PLZT, where $0<x<1$, $0<y<1$), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof, or a mixture of two or more thereof.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

A non-aqueous organic solvent was prepared by mixing ethylene carbonate (EC) and ethyl methyl carbonate (EMC) in a volume ratio of 30:70 and dissolving $LiPF_6$ in the mixture to have a concentration of 1.0 M. A non-aqueous electrolyte solution of the present invention was prepared by adding 0.01 g of the compound represented by Formula 1a and 0.01 g of the compound represented by Formula 2a (weight ratio of first additive:second additive=1:1) to 99.98 g of the non-aqueous organic solvent (see Table 1 below).

(Electrode Preparation)

A positive electrode active material ($Li(Ni_{0.6}Mn_{0.2}Co_{0.2})O_2$), a conductive agent (carbon black), and a binder (polyvinylidene fluoride) were added to N-methyl-2-pyrrolidone (NMP), as a solvent, at a weight ratio of 90:5:5 to prepare a positive electrode active material slurry (solid content of 50 wt %). A 100 μm thick positive electrode collector (Al thin film) was coated with the positive electrode active material slurry, dried, and roll-pressed to prepare a positive electrode.

A negative electrode active material (artificial graphite), a binder (PVDF), and a conductive agent (carbon black) were added to NMP, as a solvent, at a weight ratio of 95:2:3 to prepare a negative electrode active material slurry (solid content of 60 wt %). A 90 μm thick negative electrode collector (Cu thin film) was coated with the negative electrode active material slurry, dried, and roll-pressed to prepare a negative electrode.

(Secondary Battery Preparation)

After an electrode assembly was prepared by sequentially stacking a polyethylene porous film with the positive electrode and negative electrode prepared by the above-described methods, the electrode assembly was put in a battery case, the non-aqueous electrolyte solution was injected thereinto, and the battery case was sealed to prepare a lithium secondary battery (battery capacity 340 mAh).

Example 2

A non-aqueous electrolyte solution of the present invention and a secondary battery including the same were prepared in the same manner as in Example 1 except that 0.1 g of the compound represented by Formula 1a and 0.1 g of the compound represented by Formula 2a (weight ratio of first additive:second additive=1:1) were added to 99.8 g of the non-aqueous organic solvent (see Table 1 below).

Example 3

A non-aqueous electrolyte solution of the present invention and a secondary battery including the same were prepared in the same manner as in Example 1 except that 3.0 g of the compound represented by Formula 1a and 3.0 g of the compound represented by Formula 2a (weight ratio of first additive:second additive=1:1) were added to 94 g of the non-aqueous organic solvent (see Table 1 below).

Example 4

A non-aqueous electrolyte solution of the present invention and a secondary battery including the same were prepared in the same manner as in Example 1 except that 0.5 g of the compound represented by Formula 1a and 0.005 g of the compound represented by Formula 2a (weight ratio of first additive:second additive=1:0.01) were added to 99.495 g of the non-aqueous organic solvent (see Table 1 below).

Example 5

A non-aqueous electrolyte solution of the present invention and a secondary battery including the same were prepared in the same manner as in Example 1 except that 0.5 g of the compound represented by Formula 1a and 0.05 g of the compound represented by Formula 2a (weight ratio of first additive:second additive=1:0.1) were added to 99.45 g of the non-aqueous organic solvent (see Table 1 below).

Example 6

A non-aqueous electrolyte solution of the present invention and a secondary battery including the same were prepared in the same manner as in Example 1 except that 0.5 g of the compound represented by Formula 1a and 0.5 g of the compound represented by Formula 2a (weight ratio of first additive:second additive=1:1) were added to 99 g of the non-aqueous organic solvent (see Table 1 below).

Example 7

A non-aqueous electrolyte solution of the present invention and a secondary battery including the same were prepared in the same manner as in Example 1 except that 1.0 g of the compound represented by Formula 1a and 0.5 g of the compound represented by Formula 2a (weight ratio of first additive:second additive=1:0.5) were added to 98.5 g of the non-aqueous organic solvent (see Table 1 below).

Example 8

A non-aqueous electrolyte solution of the present invention and a secondary battery including the same were prepared in the same manner as in Example 1 except that 5.0 g of the compound represented by Formula 1a and 0.5 g of the compound represented by Formula 2a (weight ratio of first additive:second additive=1:0.1) were added to 94.5 g of the non-aqueous organic solvent (see Table 1 below).

Example 9

A non-aqueous electrolyte solution of the present invention and a secondary battery including the same were prepared in the same manner as in Example 1 except that 5.0 g of the compound represented by Formula 1a and 0.25 g of the compound represented by Formula 2a (weight ratio of first additive:second additive=1:0.05) were added to 94.75 g of the non-aqueous organic solvent (see Table 1 below).

Example 10

A non-aqueous electrolyte solution of the present invention and a secondary battery including the same were prepared in the same manner as in Example 1 except that 5.0 g of the compound represented by Formula 1a and 5.0 g of the compound represented by Formula 2a (weight ratio of first additive:second additive=1:1) were added to 90 g of the non-aqueous organic solvent (see Table 1 below).

Example 11

A non-aqueous electrolyte solution of the present invention and a secondary battery including the same were prepared in the same manner as in Example 1 except that 6 g of the compound represented by Formula 1a and 3 g of the compound represented by Formula 2a (weight ratio of first additive:second additive=1:0.5) were added to 91 g of the non-aqueous organic solvent (see Table 1 below).

Example 12

A non-aqueous electrolyte solution of the present invention and a secondary battery including the same were prepared in the same manner as in Example 1 except that 0.1 g of the compound represented by Formula 1a and 1.1 g of the compound represented by Formula 2a (weight ratio of first additive:second additive=1:11) were added to 98.8 g of the non-aqueous organic solvent (see Table 1 below).

Example 13

A non-aqueous electrolyte solution of the present invention and a secondary battery including the same were prepared in the same manner as in Example 1 except that 5.0 g of the compound represented by Formula 1a and 0.04 g of the compound represented by Formula 2a (weight ratio of first additive:second additive=1:0.008) were added to 94.96 g of the non-aqueous organic solvent (see Table 1 below).

Comparative Example 1

A non-aqueous electrolyte solution and a secondary battery including the same were prepared in the same manner as in Example 1 except that 2 g of vinylene carbonate was only added as an additive to 98 g of the non-aqueous electrolyte solution (see Table 1 below).

Comparative Example 2

A non-aqueous electrolyte solution and a secondary battery including the same were prepared in the same manner as in Example 1 except that a second additive was not included and 3.0 g of the compound represented by Formula 1a was added to 97 g of the non-aqueous electrolyte solution (see Table 1 below).

Comparative Example 3

A non-aqueous electrolyte solution and a secondary battery including the same were prepared in the same manner as in Example 1 except that a first additive was not included and 5.0 g of the compound represented by Formula 2a was included in 95 g of the non-aqueous electrolyte solution (see Table 1 below).

Comparative Example 4

A non-aqueous electrolyte solution and a secondary battery including the same were prepared in the same manner as in Example 1 except that a second additive was not included, and 5.0 g of the compound represented by Formula 1a and 2.0 g of vinylene carbonate were added to 93 g of the non-aqueous electrolyte solution (see Table 1 below).

Comparative Example 5

A non-aqueous electrolyte solution and a secondary battery including the same were prepared in the same manner as in Example 1 except that a first additive was not included, and 5.0 g of the compound represented by Formula 2a and 2.0 g of vinylene carbonate were added to 93 g of the non-aqueous electrolyte solution (see Table 1 below).

EXPERIMENTAL EXAMPLES

Experimental Example 1. Initial Capacity Evaluation

Each of the lithium secondary batteries prepared in Examples 1 to 13 and the lithium secondary batteries prepared in Comparative Examples 3 and 5 was charged at 0.33 C/4.25 V to 4.25 V/0.05 C under a constant current/constant voltage (CC/CV) condition at 25° C. and discharged at a constant current of 0.33 C/3.0 V. In this case, discharge capacity measured using the PNE-0506 charge/discharge equipment (manufacturer: PNE SOLUTION Co., Ltd., 5 V, 6 A) after cell assembly and before high-temperature storage was defined as initial discharge capacity. The measured initial capacities are listed in Table 1 below.

TABLE 1

|  | Amount of first additive added (g) | Amount of second additive added (g) | Weight ratio of first additive:second additive | Other additives Type | Other additives Amount added (g) | Total amount of additives | Initial capacity (mAh/g) |
|---|---|---|---|---|---|---|---|
| Example 1 | 0.01 | 0.01 | 1:1 | — | — | 0.02 | 1.062 |
| Example 2 | 0.1 | 0.1 | 1:1 | — | — | 0.2 | 1.063 |
| Example 3 | 3 | 3 | 1:1 | — | — | 6 | 1.048 |
| Example 4 | 0.5 | 0.005 | 1:0.01 | — | — | 0.505 | 1.064 |
| Example 5 | 0.5 | 0.05 | 1:0.1 | — | — | 0.55 | 1.063 |
| Example 6 | 0.5 | 0.5 | 1:1 | — | — | 1 | 1.062 |
| Example 7 | 1 | 0.5 | 1:0.5 | — | — | 1.5 | 1.063 |
| Example 8 | 5 | 0.5 | 1:0.1 | — | — | 5.5 | 1.058 |
| Example 9 | 5 | 0.25 | 1:0.05 | — | — | 5.5 | 1.060 |
| Example 10 | 5 | 5 | 1:1 | — | — | 10 | 1.046 |
| Example 11 | 6 | 3 | 1:0.5 | — | — | 9 | 1.048 |
| Example 12 | 0.1 | 1.1 | 1:11 | — | — | 1.2 | 1.050 |
| Example 13 | 5 | 0.04 | 1:0.008 |  |  | 5.04 | 1.059 |
| Comparative Example 3 | — | 5 | 0:5 | — | — | 5 | 1.047 |
| Comparative Example 5 | — | 5 | 0:5 | VC | 2 | 7 | 1.041 |

Referring to Table 1, it may be understood that initial capacities of the lithium secondary batteries of Examples 1 to 9 and 11 to 13, which respectively included the non-aqueous electrolyte solutions containing the mixed additive, were about 1.048 mAh/g or more.

In contrast, initial capacities of the lithium secondary batteries of Comparative Examples 3 and 5, which respectively included the non-aqueous electrolyte solutions not containing the first additive and the second additive together, were 1.047 mAh/g or less, wherein it may be understood that the initial capacities of the lithium secondary batteries of Comparative Examples 3 and 5 were lower than those of the lithium secondary batteries of Examples 1 to 9 and 11 to 13.

With respect to the lithium secondary battery of Example 10 which included the non-aqueous electrolyte solution containing a larger amount of the additive than the lithium secondary battery of Comparative Example 3, it may be understood that, since a thick film was formed at an initial stage of charge and discharge, initial capacity relatively lower than that of the lithium secondary battery of Comparative Example 3 was obtained.

Experimental Example 2. Resistance Increase Rate Evaluation After High-temperature Storage After each of the lithium secondary batteries prepared in Examples 1 to 13 and the lithium secondary batteries prepared in Comparative Examples 1 to 5 was charged at 0.33 C/4.25 V to 4.25 V/0.05 C under a constant current-constant voltage condition at 25° C. and discharged at 0.33 C to set a charge status of the battery to a state of charge (SOC) of 50%, a voltage drop, which was obtained in a state in which each lithium secondary battery was subjected to a discharge pulse at a constant current of 2.5 C for 30 seconds, was measured using the PNE-0506 charge/discharge equipment (manufacturer: PNE SOLUTION Co., Ltd., 5 V, 6 A) to obtain an initial resistance value. Thereafter, each lithium secondary battery was charged at 0.33 C/4.25 V to 4.25 V/0.05 C under a constant current-constant voltage condition within a driving voltage range of 3.0 V to 4.25 V to set a charge status of the battery to a SOC of 100%.

Then, each secondary battery was left standing at 60° C. for 4 weeks.

Subsequently, after each secondary battery was charged at 0.33 C/4.25 V to 4.25 V/0.05 C under a constant current-constant voltage condition and discharged at 0.33 C to set a charge status of the battery to a SOC of 50%, a voltage drop, which was obtained in a state in which each lithium secondary battery was subjected to a discharge pulse at a constant current of 2.5 C for 30 seconds, was measured using the PNE-0506 charge/discharge equipment (manufacturer: PNE SOLUTION Co., Ltd., 5 V, 6 A) to obtain a resistance value after high-temperature storage.

A resistance increase rate (%) for each secondary battery was calculated from a ratio of the resistance increased after high-temperature storage to the initial resistance using Equation (1) below, and the results thereof are present in Table 2 below.

$$\text{Resistance increase rate}(\%) = \{(\text{resistance after high-temperature storage} - \text{initial resistance})/\text{initial resistance}\} \times 100 \quad \text{Equation (1):}$$

Referring to Table 2 below, with respect to the lithium secondary batteries of Examples 1 to 13 which respectively included the non-aqueous electrolyte solutions containing the mixed additive, resistance increase rates after high-temperature storage were 17.7% or less, but resistance increase rates after high-temperature storage of the lithium secondary batteries of Comparative Examples 1 to 5, which respectively included the non-aqueous electrolyte solutions not containing the first additive and the second additive together, were mostly 18.0% or more, wherein it may be understood that the resistance increase rates after high-temperature storage of the lithium secondary batteries of Comparative Examples 1 to 5 were increased in comparison to those of the lithium secondary batteries of Examples 1 to 13.

Experimental Example 3. Evaluation of Battery Thickness Increase Rate After High-temperature Storage Each of the lithium secondary batteries prepared in Examples 1 to 13 and Comparative Examples 1 and 3 to 5 was fully charged at 0.33 C/4.25 V to 4.25 V/0.05 C under a constant current-constant voltage condition at 25° C. within a driving voltage range of 3.0 V to 4.25 V and a thickness of each secondary battery was measured with a plate thickness gauge (Mitutotyo (Japan)) at a SOC of 100%. A thickness first measured after cell assembly was defined as an initial thickness.

Subsequently, each of the lithium secondary batteries subjected to the initial charge and discharge was charged at 4.25 V to a SOC of 100% and stored at 60° C. for 4 weeks.

Next, each lithium secondary battery was cooled at room temperature and a thickness after high-temperature storage was then measured using the plate thickness gauge (Mitutotyo (Japan)), a thickness increase rate was calculated by substituting the measured initial thickness and thickness after high-temperature storage into the following Equation (2), and the results thereof are presented in Table 2 below.

thickness increase rate (%)={(thickness after high-temperature storage/initial thickness)×100}−100    Equation (2):

Referring to Table 2 below, with respect to the lithium secondary batteries of Examples 1 to 13 which respectively included the non-aqueous electrolyte solutions containing the mixed additive, thickness increase rates after high-temperature storage were 5.0% or less, but thickness increase rates after high-temperature storage of the lithium secondary batteries of Comparative Examples 1 and 3 to 5, which respectively included the non-aqueous electrolyte solutions not containing the first additive and the second additive together, were mostly 5.6% or more, wherein it may be understood that the thickness increase rates after high-temperature storage of the lithium secondary batteries of Comparative Examples 1 and 3 to 5 were increased in comparison to those of the lithium secondary batteries of Examples 1 to 13.

Experimental Example 4. Capacity Retention Evaluation After High-temperature Storage Each of the lithium secondary batteries prepared in Examples 1 to 13 and Comparative Examples 1 to 5 was charged at 0.33 C/4.25 V to 4.25 V/0.05 C under a constant current/constant voltage (CC/CV) condition at 25° C. and discharged at a constant current of 0.33 C/3.0 V. In this case, discharge capacity measured using the PNE-0506 charge/discharge equipment (manufacturer: PNE SOLUTION Co., Ltd., 5 V, 6 A) after cell assembly/before high-temperature storage was defined as initial discharge capacity.

Subsequently, each of the secondary batteries was set to a SOC of 100% and then stored at 60° C. for 4 weeks.

Next, each secondary battery was charged at 0.33 C/4.25 V to 4.25 V/0.05 C under a constant current/constant voltage (CC/CV) condition at 25° C. and discharged at a constant current of 0.33 C/3.0 V, and discharge capacity was measured using the PNE-0506 charge/discharge equipment (manufacturer: PNE SOLUTION Co., Ltd., 5 V, 6 A). In this case, the measured discharge capacity was defined as discharge capacity after high-temperature storage.

Capacity retention was measured by substituting the measured initial discharge capacity and discharge capacity after high-temperature storage into the following Equation (3), and the results thereof are listed in Table 2 below.

capacity retention (%)=(discharge capacity after high-temperature storage/initial discharge capacity)×100    Equation (3):

Referring to Table 2 below, with respect to the lithium secondary batteries of Examples 1 to 13 which respectively included the non-aqueous electrolyte solutions containing the mixed additive, capacity retentions after high-temperature storage were 90.1% or more, but capacity retentions after high-temperature storage of the lithium secondary batteries of Comparative Examples 1 to 5, which did not contain the first additive and the second additive together, were mostly 89.9% or less, wherein it may be understood that the capacity retentions after high-temperature storage of the lithium secondary batteries of Comparative Examples 1 to 5 were inferior to those of the lithium secondary batteries of Examples 1 to 13.

With respect to the secondary battery of Example 11, which included the non-aqueous electrolyte solution containing an excessive amount of the first additive, and the lithium secondary batteries of Examples 12 and 13 which respectively included the non-aqueous electrolyte solutions containing a relatively larger amount or smaller amount of the second additive than the first additive, it may be understood that the capacity retentions after high-temperature storage were relatively inferior to those of the lithium secondary batteries of Examples 1 to 10.

TABLE 2

| | Amount of first additive added (g) | Amount of second additive added (g) | Weight ratio of first additive:second additive | Other additives Type | Other additives Amount added (g) | Total amount of additives | After high-temperature storage Capacity retention (%) | After high-temperature storage Resistance increase rate (%) | After high-temperature storage Thickness increase rate (%) |
|---|---|---|---|---|---|---|---|---|---|
| Example 1 | 0.01 | 0.01 | 1:1 | — | — | 0.02 | 91.1 | 17.7 | 4.9 |
| Example 2 | 0.1 | 0.1 | 1:1 | — | — | 0.2 | 91.6 | 12.5 | 4.8 |
| Example 3 | 3 | 3 | 1:1 | — | — | 6 | 91.7 | 7.9 | 4.0 |
| Example 4 | 0.5 | 0.005 | 1:0.01 | — | — | 0.505 | 94.2 | 16.3 | 4.5 |
| Example 5 | 0.5 | 0.05 | 1:0.1 | — | — | 0.55 | 94.6 | 14.4 | 4.3 |
| Example 6 | 0.5 | 0.5 | 1:1 | — | — | 1 | 94.6 | 8.2 | 4.2 |
| Example 7 | 1 | 0.5 | 1:0.5 | | | 1.5 | 93.2 | 8.0 | 4.1 |
| Example 8 | 5 | 0.5 | 1:0.1 | — | — | 5.5 | 93.1 | 8.0 | 4.0 |
| Example 9 | 5 | 0.25 | 1:0.05 | — | — | 5.5 | 92.9 | 8.2 | 4.0 |
| Example 10 | 5 | 5 | 1:1 | — | — | 10 | 92.4 | 7.8 | 4.0 |
| Example 11 | 6 | 3 | 1:0.5 | — | — | 9 | 90.8 | 8.0 | 3.9 |
| Example 12 | 0.1 | 1.1 | 1:11 | — | — | 1.2 | 90.4 | 8.2 | 5.0 |
| Example 13 | 5 | 0.04 | 1:0.008 | | | 5.04 | 90.1 | 16.4 | 4.2 |
| Comparative Example 1 | — | — | — | VC | 2 | 2 | 87.5 | 35.4 | 5.8 |
| Comparative Example 2 | 3 | — | 3:0 | — | — | 3 | 87.7 | 24.5 | — |
| Comparative Example 3 | — | 5 | 0:5 | — | — | 5 | 88.0 | 18.0 | 5.8 |

TABLE 2-continued

| | Amount of first additive added (g) | Amount of second additive added (g) | Weight ratio of first additive:second additive | Other additives Type | Other additives Amount added (g) | Total amount of additives | After high-temperature storage Capacity retention (%) | After high-temperature storage Resistance increase rate (%) | After high-temperature storage Thickness increase rate (%) |
|---|---|---|---|---|---|---|---|---|---|
| Comparative Example 4 | 5 | — | 3:0 | VC | 2 | 7 | 89.0 | 19.3 | 5.6 |
| Comparative Example 5 | — | 5 | 0:5 | VC | 2 | 7 | 89.9 | 18.4 | 6.0 |

The invention claimed is:

1. A non-aqueous electrolyte solution for a lithium secondary battery, the non-aqueous electrolyte solution comprising:
a lithium salt;
an organic solvent;
a first additive; and
a second additive,
wherein the first additive is a compound represented by Formula 1, and the second additive is a compound represented by Formula 2:

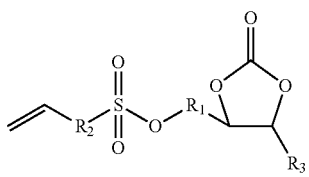

[Formula 1]

wherein, in Formula 1,
$R_1$ and $R_2$ are each independently a substituted or unsubstituted alkylene group having 1 to 5 carbon atoms, and $R_3$ is hydrogen or a substituted or unsubstituted alkyl group having 1 to 5 carbon atoms,

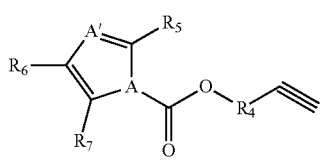

[Formula 2]

wherein, in Formula 2,
A and A' are each independently oxygen (O), sulfur(S), or nitrogen (N),
$R_4$ is a substituted or unsubstituted alkylene group having 1 to 5 carbon atoms, and $R_5$ to $R_7$ are each independently hydrogen or an alkyl group having 1 to 4 carbon atoms,
wherein the organic solvent does not comprise propyl propionate.

2. The non-aqueous electrolyte solution for a lithium secondary battery of claim 1, wherein, in Formula 1, $R_1$ and $R_2$ are each independently an unsubstituted alkylene group having 1 to 4 carbon atoms, and $R_3$ is hydrogen or an alkyl group having 1 to 3 carbon atoms.

3. The non-aqueous electrolyte solution for a lithium secondary battery of claim 1, wherein, in Formula 1, $R_1$ and $R_2$ are each independently an unsubstituted alkylene group having 1 to 3 carbon atoms, and $R_3$ is hydrogen.

4. The non-aqueous electrolyte solution for a lithium secondary battery of claim 1, wherein the first additive comprises a compound represented by Formula 1a:

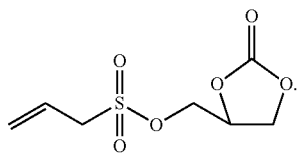

[Formula 1a]

5. The non-aqueous electrolyte solution for a lithium secondary battery of claim 1, wherein the compound represented by Formula 1 is present in an amount of 0.01 wt % to 5 wt % based on a total weight of the non-aqueous electrolyte solution.

6. The non-aqueous electrolyte solution for a lithium secondary battery of claim 1, wherein, in Formula 2, A and A' are N, $R_4$ is a substituted or unsubstituted alkylene group having 1 to 3 carbon atoms, and $R_5$ to $R_7$ are each independently hydrogen or an alkyl group having 1 to 3 carbon atoms.

7. The non-aqueous electrolyte solution for a lithium secondary battery of claim 1, wherein the second additive comprises at least one represented by Formulae 2a or 2b:

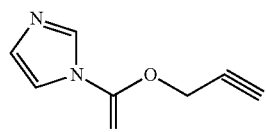

[Formula 2a]

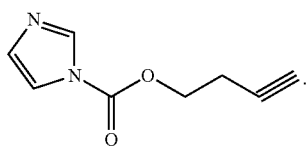

[Formula 2b]

8. The non-aqueous electrolyte solution for a lithium secondary battery of claim 1, wherein the first additive and the second additive are present in a weight ratio of 1:0.01 to 1:10.

9. The non-aqueous electrolyte solution for a lithium secondary battery of claim 1, further comprising at least one additive of a halogen-substituted or unsubstituted cyclic carbonate-based compound, a nitrile-based compound, a phosphate-based compound, a borate-based compound, a sulfate-based compound, a sultone-based compound, or a lithium salt-based compound.

10. A lithium secondary battery comprising the non-aqueous electrolyte solution of claim 1.

* * * * *